April 28, 1936.   C. J. KESSLER   2,038,740
HEATING APPARATUS
Filed Aug. 22, 1934   4 Sheets-Sheet 1

INVENTOR.
Charles J. Kessler
BY Hull, Brock & West
ATTORNEYS

April 28, 1936.  C. J. KESSLER  2,038,740
HEATING APPARATUS
Filed Aug. 22, 1934  4 Sheets-Sheet 4

INVENTOR.
Charles J. Kessler
BY Hull, Brock & West
ATTORNEYS

Patented Apr. 28, 1936

2,038,740

UNITED STATES PATENT OFFICE 2,038,740

HEATING APPARATUS

Charles J. Kessler, Cleveland Heights, Ohio, assignor to Perfection Stove Company, Cleveland, Ohio, a corporation of Ohio Application August 22, 1934, Serial No. 740,977

10 Claims. (Cl. 98—101)

This invention relates to heating apparatus of the kind in which the properties of both circulating and radiating heaters are combined. Examples of such heaters are to be found in Pape Patent No. 1,623,634, dated April 5, 1927, and in a copending application Serial No. 730,370, filed by Lee S. Chadwick on June 13, 1934; and, generally, they comprise a heat radiating unit, such as a combustion device, and a casing that encloses the same and is spaced therefrom. The walls of the casing have openings through which heat may be radiated from the unit, and control means are included for wholly or partially closing said openings when it is desired to intercept the radiant heat and induce a circulation of air upwardly through the casing, the casing having an inlet for fresh air at the bottom and an outlet for heated air at the top. By different adjustments of said control means, a wide variation in heat distribution may be obtained.

The general objects of the invention are to simplify and cheapen, and yet improve, the construction of heaters of the above described class; and to provide therein efficient but inexpensive mechanism that is very convenient of manipulation for adjusting the control means and for holding it in various positions of adjustment.

Figure 1:
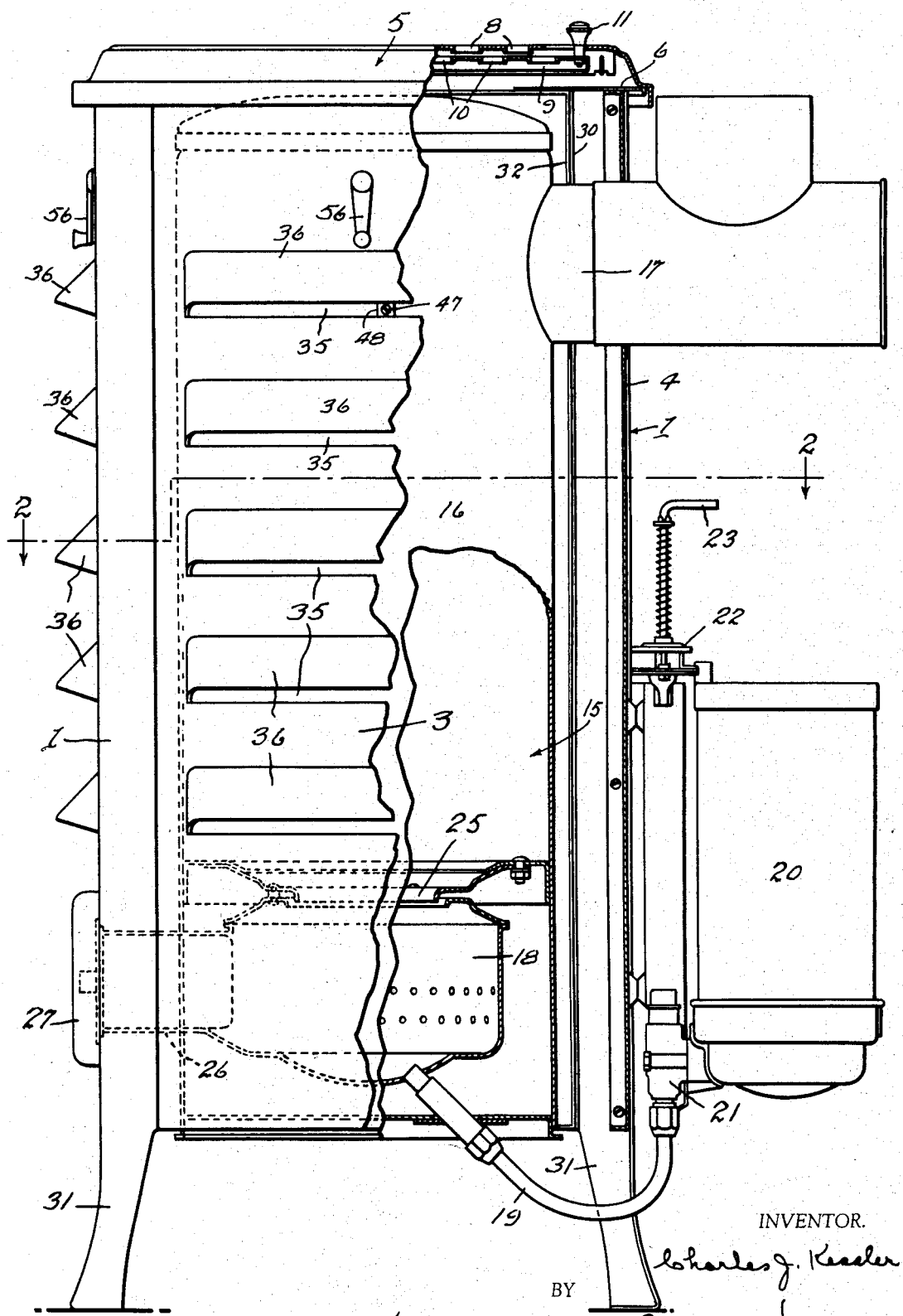
Figure 2:
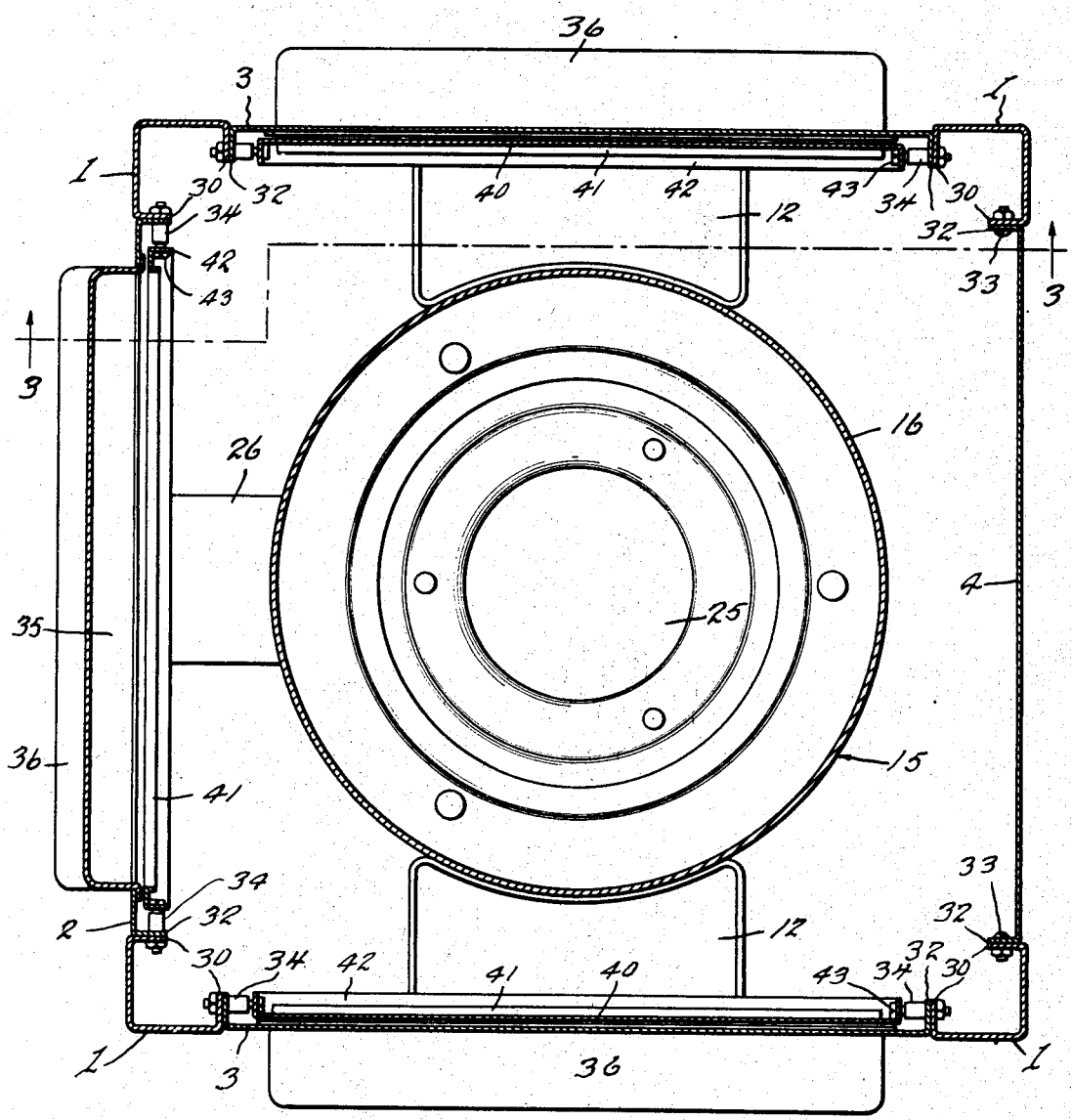
Figure 3:
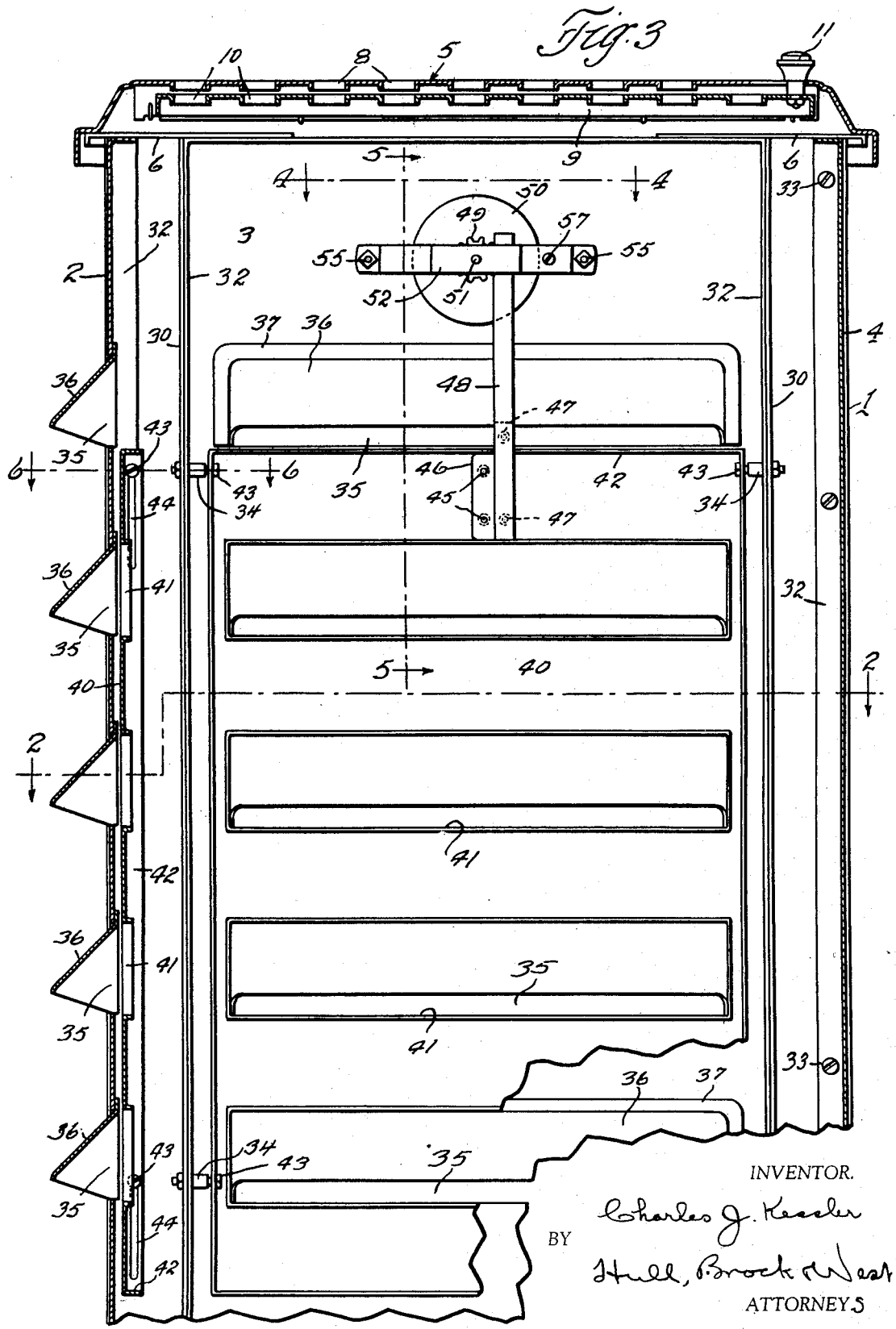
Figure 4:
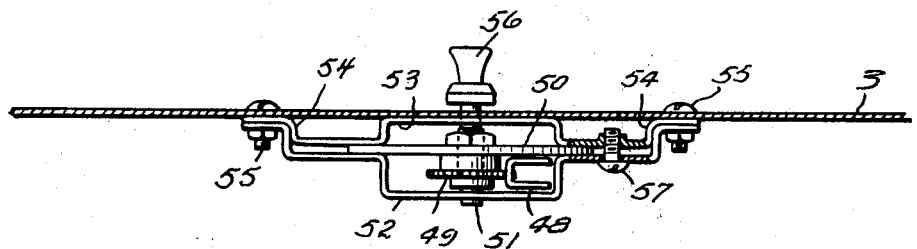
Figure 5:
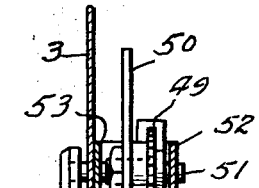
Figure 6:
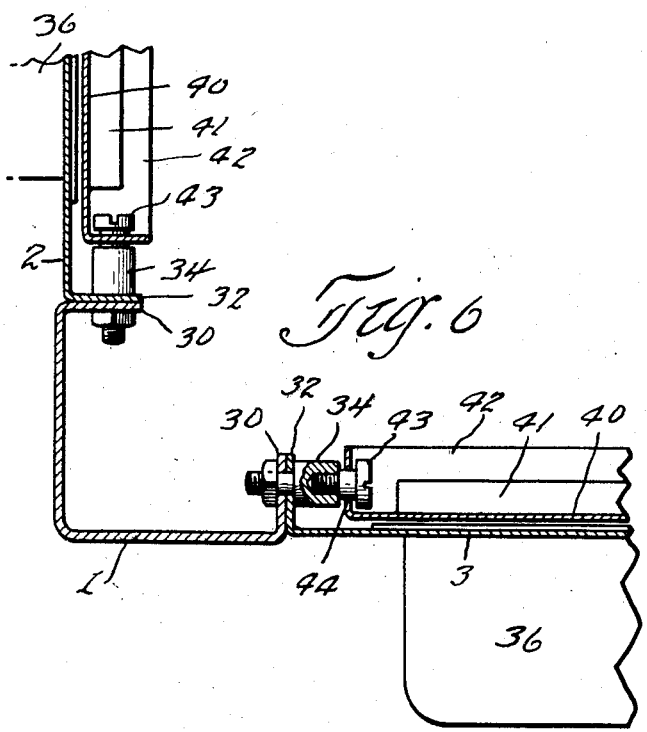

These objects, with others hereinafter appearing, are attained in the embodiment of the invention illustrated in the accompanying drawings wherein Fig. 1 represents a side elevation, partly in section, of a heating apparatus embodying my improvements; Fig. 2 is a sectional plan on a scale somewhat enlarged over that of Fig. 1, the section being in different planes as indicated by the lines 2—2 of Figs. 1 and 3; Fig. 3 is a vertical section substantially on the line 3—3 of Fig. 2; and Figs. 4, 5 and 6 are sectional details, on a further enlarged scale, taken on the respective lines 4—4, 5—5 and 6—6 of Fig. 3.

The casing of the apparatus comprises corner posts 1, a front panel 2, side panels 3 and a rear panel 4. The rectangular structure formed of these parts is surmounted by a top 5 that is attached to members 6 which, in turn, are suitably fastened to the upper corners of said structure. The details of the top constitute no part of the present invention and may be obtained from the above mentioned application, although it may be well to explain briefly in this connection that the top 5 has openings 8 for the emission of hot air which may be controlled by one or more slides, one of which is shown in Fig. 1 and designated 9, the same having openings 10 corresponding in size and arrangement with the openings 8 of the top, the slide being suitably mounted for reciprocation by means of a knob 11.

Supported centrally within the casing, in spaced relation to the walls thereof, as by brackets 12 (Fig. 2), is a heat radiating unit or combustion device 15. The present invention is not concerned with the details of this device or unit, and for illustrative purposes I have shown the one disclosed in the application hereinbefore referred to, the same comprising a drum 16, closed at the top, and having an outlet 17 that extends rearwardly from its upper end through the rear panel 4 for connection with a flue. Suitably supported within the bottom of the drum 16 is a burner bowl 18 to which liquid fuel is fed through a supply conduit 19 from a reservoir 20, the flow of fuel being controlled by a valve 21 in said conduit whose operating handle is designated 22. The conduit is equipped with a cleanout device that may be manipulated by means of a handle 23. The burner bowl opens through a throat 25 into a combustion chamber that is enclosed by the portion of the drum 16 above said throat and access to the burner bowl for lighting and cleaning purposes is had through a tubular extension 26 that opens through the front panel 2 and is normally covered by a closure 27.

Each corner post 1 consists of a sheet metal angle member having inturned flanges 30 along its lateral edges and terminating at its lower end beyond said flanges in a leg 31. The front, side and rear panels 2, 3 and 4, respectively, have peripheral flanges whose portions 32 extend along the lateral edges of the panels and are engaged with the adjacent flanges 30 of the corner posts, said flanges of the panels and corner posts being secured together by suitable fastening means, some of which, designated 33, may consist of ordinary bolts, while others designated 34 are of special construction as, and for reasons, hereinafter explained.

The front panel 2 and the side panels 3 have openings 35, shown as horizontal slots that are spaced apart a distance substantially equal to their vertical dimension. Each opening 35 is equipped with a louver 36, and the same is shown as having a flange 37 along its top and ends that is engaged with the inner side of the panel along the corresponding sides of the opening, and said flange is secured to the panel in any suitable manner, as by spot welding.

In the absence of any obstruction, heat radiated from the unit 15 will pass through the openings 35 of the front and side panels of the casing and be deflected downwardly to some extent by the louvers 36. The passage of radiant heat through the openings 35, however, is adapted to be controlled by slides 40 that are reciprocably supported adjacent the inner sides of said panels. Each slide 40 consists of a plate having openings 41 that correspond in size and arrangement with the openings 35 of the adjacent panel. To impart rigidity to the slide 40, it is flanged about the opening 41, and it also has a peripheral flange whose portions 42 extend along the lateral edges of the slide and are parallel to and spaced from the flange portions 32 of the panel.

The previously mentioned fastening means 34, that assist in connecting the flanges of the corner posts and panels together, are located adjacent the corners of the slides 40 and the same consist of bolts having cylindrical heads that are bored and tapped for the reception of shouldered screws 43 that are extended through slots 44 in the flange portions 42 of the slides, the slides being thus reciprocably supported and properly guided, the latter resulting from the fact that the portions of the flanges surrounding the slots 44 are confined within reasonable limits, such as will insure freedom of movement, between the heads of the screws 43 and the ends of the bolts into which said screws are threaded, the body portion of the screws being of a diameter slightly less than the width of the slots.

Attached, as by screws 45, to the upper end of each slide 40, is a fitting 46, to a side extension of which is secured, as by screws 47, a rack 48, the same consisting of a deep channel member in whose web are a row of holes for cooperation with the teeth of a pinion 49. Said pinion, with a disk 50, is secured to a shaft 51. Spaced portions of said shaft are journaled within bearing apertures in opposed brackets 52 and 53, formed of metal straps whose central portions are separated sufficiently to accommodate between them the various mountings on the shaft, including the pinion 49 and disk 50; and inwardly of the periphery of the disk 50 the straps are bent toward each other and thence outwardly in parallel relation and in frictional contact with the opposite sides of the disk and therebeyond terminate in laterally bent base portions 54 that are engaged with each other and suitably secured to the adjacent panel, as by bolts 55. The outer end of the shaft 51 is extended through a hole in said panel and is equipped with an operating handle or crank 56. The portions of the brackets 52 and 53 that engage the disk 50 are adapted to be adjusted with respect to each other so as to vary their pressure on the disk by a screw 57 that is extended freely through a hole in the bracket 52 and is threaded into a tapped hole of the bracket 53.

It will be seen from the foregoing description that by turning the operating handles or cranks 56, the slides 40 may be adjusted vertically to shift the openings 41 of the slides into and out of register with the openings 35 of the panels 2 and 3; and that the slides will be held in any position to which they are adjusted by the friction device consisting of the disk 50 and the portions of the brackets 52 and 53 that engage the opposite sides thereof. When the slides 40 are adjusted so that their openings fully register with those of the panels, heat will be radiated from the unit 15 through said openings, as hereinbefore explained, and at such time the control means associated with the top of the casing may be positioned to prevent a flow of air therethrough. If it is desired to cause the apparatus to function as a circulating heater instead of a radiating heater, as above, the control means in the top may be shifted to uncover the openings 8, and the slides 40 adjusted to close the openings 35 in the front and side panels. Between these two extreme conditions, the various slides 40 and top control may be regulated to effect heat distribution of many varieties, as will be readily understood.

Having thus described my invention, what I claim is:

1. In combination, a structure involving a wall having a series of openings, a slide with a similar series of openings, the slide having slotted flanges along its lateral edges, bearing members on the structure projecting through the slots of said flanges thereby to movably support the slide in operative relation to the wall, and means for holding the slide in different positions of adjustment.

2. In combination, a structure involving a wall having a series of openings, a slide with a similar series of openings, the slide having flanges extending along its lateral edges at substantially right angles to its body portion, said flanges having longitudinal slots, flanges on the structure between which the slide is arranged with its flanges parallel to and spaced from the flanges of the structure, members carried by the latter flanges, said members having tapped holes, and shouldered screws extended through the slots of the slide and threaded into said members whereby the slide is movably supported in operative relation to the wall, and means for holding the slide in different positions of adjustment.

3. In combination, a structure involving a wall having a series of openings, a slide with a similar series of openings movably supported in operative relation to said wall, a rack connected to said slide, a pinion meshing with the rack, a disk rotatable with the pinion, means for rotating the disk and pinion, and friction means engaging the disk for holding it in various positions of adjustment.

4. In combination, a structure involving a wall having a series of openings, a slide wih a similar series of openings movably supported in operative relation to said wall, a rack connected to said slide, a pinion meshing with the rack, a shaft to which said pinion is fixed, opposed members within which longitudinally spaced bearing portions of the shaft are journaled, a disk fastened to the shaft between said opposed members, the opposed members approaching each other and frictionally engaging opposite sides of the peripheral portions of the disk, means attaching said members to the wall of the casing, and means for adjusting said members to vary their pressure on the disk.

5. In combination, a structure involving corner posts, a panel supported by and between said posts and having a series of openings, louvers for said openings extending outwardly and downwardly from the plane of the panel, a slide having a similar series of openings supported for reciprocation adjacent the inner side of the panel, actuating mechanism carried by the panel on the inner side thereof for adjusting the slide, a member on the outer side of the panel by which said mechanism may be operated, and friction means incorporated in said mechanism for holding the slide in any position to which it is adjusted.

6. In combination, an adjustably supported shutter, a member operatively connected to said shutter and to which a rotary motion is imparted when said shutter is adjusted, and a friction device engaging the member for holding said shutter in various positions of adjustment through the intervention of said member.

7. In combination, an adjustably supported shutter, a disk operatively connected thereto and rotated when said shutter is adjusted and opposed members between which the disk is frictionally engaged for holding it in different positions of adjustment.

8. In combination, an adjustably supported shutter, a disk operatively connected thereto and rotated when said shutter is adjusted, opposed members between which the disk is frictionally engaged, and means for adjusting said members to vary their pressure on the disk.

9. In combination, an adjustably supported shutter, actuating mechanism for adjusting said shutter and for holding it in various positions of adjustment, the same including a rack connected to the shutter, a pinion meshing with the rack, a disk rotatable with the pinion, and friction means engaging the disk.

10. In combination, an adjustably supported shutter, actuating mechanism for adjusting said shutter and for holding it in various positions of adjustment, the same including a rack connected to the shutter, a pinion meshing with the rack, a disk rotatable with the pinion, and opposed members between which the disk is frictionally engaged.

CHARLES J. KESSLER.